UNITED STATES PATENT OFFICE.

CHARLES SUMNER DOLLEY, OF NELSON, NEW HAMPSHIRE.

PLASTIC COMPOSITION FOR MAKING RECEPTACLES.

1,146,787.     Specification of Letters Patent.     Patented July 20, 1915.

No Drawing.     Application filed July 11, 1912. Serial No. 708,755.

*To all whom it may concern:*

Be it known that I, CHARLES SUMNER DOLLEY, citizen of the United States, residing at Nelson, in the county of Cheshire and State of New Hampshire, have invented certain new and useful Improvements in Plastic Compositions for Making Receptacles, of which the following is a specification.

The object of the invention is to produce a plastic composition adapted for the manufacture of containers or packages for organic fluids and which is capable of being molded or formed by suitable mechanical means into the shapes desired, and by means of pressure and heat to be so compacted and shaped as to retain permanently the form of the molds or patterns in which the same has been placed and treated and to be thereby so altered chemically and structurally as to afford a final product possessing toughness and impermeability, possessing somewhat of the nature of ceramic ware but superior to such ware in being lighter in weight and less liable to breakage and at the same time being chemically inert, not readily attacked by alkalis or acids, insoluble in water, tasteless, odorless, non-poisonous, and affording no favorable nidus for the development of micro-organisms.

I am aware that plastic compositions intended for substantially the purpose named have been formed of wood pulp or other vegetable fiber in conjunction with mineral silicates and organic binding materials, but so far as known to me such compositions have in common been too fragile to withstand the severe handling to which receptacles or packages of this general kind are subjected in commercial use.

The object of this invention is, therefore, to supply an improved plastic composition uniting the desirable features of ceramic ware while excelling such ware in toughness, lightness and adaptability to resist severe usage.

In the preparation of the composition which constitutes the form of my invention which I prefer, I employ the following materials referred to in substantially the following proportions:

| | |
|---|---|
| Ground kaolin (aluminum silicate) | 200 lbs. |
| Wood pulp (dry) | 100 " |
| Casein | 5 " |
| Gelatin | 5 " |
| Sodium resinate | 10 " |
| Gutta | 5 " |

The ingredients, except the gutta, are first brought by any suitable means to a proper degree of communication by grinding, crushing or otherwise powdering and are gradually combined in the dry state until thoroughly and uniformly mixed, when there is added to the dry mass a sufficient quantity of pure water to form a perfect emulsion or plastic composition, this mixture being facilitated by the use of suitable mixing machinery, the water being gradually added.

All of the ingredients, except the gutta, lend themselves readily to the formation of a uniform, homogeneous emulsion. The gutta, if mixed in a mass, would not chemically commingle with the other ingredients. The manner in which I secure its addition to the mass is as follows: It is first dissolved in a suitable solvent like benzol, and is then gradually sprayed in solution on the other ingredients while they are being mixed. This may be accomplished by means of an atomizer or other usual suitable device. In this way the proper proportion of gutta may be mixed and evenly distributed throughout the mass so that afterward when it is subjected to heat and pressure, its adhesive and elastic qualities are contributed to the entire mass uniformly.

I have found that the resulting mass when placed in suitable molds and subjected to the action of heat and pressure forms the desirable resulting plastic composition above referred to, and I attribute much of its valuable qualities to the addition of the gutta gum. This gum is most common in the form of gutta percha and balata but I do not restrict myself to the use of it in that form but claim the right to use any form which I may find suitable. I also do not restrict myself to the use of the exact amount of the ingredients mentioned, but feel free to vary the relative amounts of such ingredients within reasonable limits for the purpose of producing as a final result a composition having the qualities of impermeability and elasticity above mentioned.

The improved plastic mass of the composition above described is peculiarly adapted to the manufacture of receptacles, containers or packages which are molded and dried under pressure and heat. They secure a perfect compaction and induration of the inorganic ingredients and a perfect blending of the binding materials.

What I claim as new is:

1. A composition of matter comprising kaolin, wood pulp, casein, gelatin, sodium resinate, and gutta gum.

2. The process of making a plastic composition which consists in mixing in a finely divided state kaolin, wood pulp, casein, gelatin, and sodium resinate, adding water thereto until the same forms an emulsion, and adding thereto in a finely divided state a solution of gutta gum.

3. The process of making a plastic composition which consists in mixing in a dry pulverized state kaolin, wood pulp, casein, gelatin, and sodium resinate, adding water thereto until the same forms an emulsion and spraying into the emulsion a solution of gutta gum.

In testimony whereof I have affixed my signature in presence of two witnesses.

CHARLES SUMNER DOLLEY.

Witnesses:
S. J. Cox,
E. J. Noble.